(12) United States Patent
Golubiewski et al.

(10) Patent No.: US 6,864,828 B1
(45) Date of Patent: Mar. 8, 2005

(54) METHOD AND APPARATUS FOR COLLECTION AND PROCESSING OF INTERFEROMETRIC SYNTHETIC APERTURE RADAR DATA

(75) Inventors: Arthur C. Golubiewski, Littleton, CO (US); Randall Schnathorst, Littleton, CO (US)

(73) Assignee: Lockheed Martin Corporation, Bethesda, MD (US)

(*) Notice: Subject to any disclaimer, the term of this patent is extended or adjusted under 35 U.S.C. 154(b) by 65 days.

(21) Appl. No.: 10/704,293

(22) Filed: Nov. 7, 2003

Related U.S. Application Data
(60) Provisional application No. 60/448,020, filed on Feb. 18, 2003.

(51) Int. Cl.[7] .............................................. G01S 13/90
(52) U.S. Cl. .............................. 342/25; 342/26; 342/52; 342/58; 342/59; 342/60; 342/82; 342/147; 342/156; 342/175; 342/190; 342/191
(58) Field of Search .............................. 342/25, 26, 52, 342/58–60, 73–103, 147, 156, 175, 176, 179, 190–197, 25 R–25 F, 26 R–26 D

(56) References Cited

U.S. PATENT DOCUMENTS

| | | |
|---|---|---|
| 3,614,778 A | 10/1971 | Graham et al. |
| 3,735,400 A | 5/1973 | Sletten et al. |
| 3,787,840 A | 1/1974 | Dotson |
| 3,787,849 A | 1/1974 | Sletten et al. |
| 3,975,734 A | 8/1976 | Payne |
| 4,052,889 A | 10/1977 | Mucciardi et al. |
| 4,053,885 A | 10/1977 | Tomita et al. |
| 4,086,590 A | 4/1978 | Goggins, Jr. |
| 4,164,788 A | 8/1979 | Jain |
| 4,217,583 A | 8/1980 | Hiller et al. |
| 4,241,350 A | 12/1980 | Uffelman |

(List continued on next page.)

OTHER PUBLICATIONS

Rafael C. Gonzalez & Paul Wintz, "Digital Image Processing", 1997, 5 Pages (pp. 16–19).
Chapter 7 Image Processing Basics, 7.3 Visual Phenomena, 4 Pages (pp. 429–432).

(List continued on next page.)

*Primary Examiner*—Bernarr Earl Gregory
(74) *Attorney, Agent, or Firm*—Marsh Fischmann & Breyfogle LLP

(57) ABSTRACT

A system and method provide for the collection of interferometric synthetic aperture radar (IFSAR) data. In the system, a first space vehicle configured for emitting electro-magnetic energy and collecting the reflection from a region of interest (ROI), may be directed along a first orbital track. The collected image data may be stored and later provided to a ground station for image and interferometric processing. A second space vehicle may also be configured for emission and collection of electro-magnetic energy reflected from the plurality of ROI's. The second space vehicle is positioned in an aligned orbit with respect to the first space vehicle where the separation between the vehicles is known. In order to minimize decorrelation of the ROI during image processing, the lead and trail satellite are configured to substantially simultaneously emit electromagnetic pulses image data collection. In order to avoid interference in the collection of this image data, each system is configured to control the emission of pulses such that the receipt of direct and bistatic pulses by the other vehicles does not interfere with data collection.

25 Claims, 11 Drawing Sheets

U.S. PATENT DOCUMENTS

| | | | |
|---|---|---|---|
| 4,559,537 A | | 12/1985 | Perason, Jr. et al. |
| 4,602,257 A | * | 7/1986 | Grisham ................... 342/25 |
| 4,608,566 A | | 8/1986 | Ennis et al. |
| 4,655,228 A | | 4/1987 | Shimura et al. |
| 4,675,677 A | | 6/1987 | von Maydell et al. ........ 342/25 |
| 4,727,373 A | * | 2/1988 | Hoover ................... 342/25 |
| 4,758,838 A | * | 7/1988 | Maeda et al. .............. 342/25 |
| 4,761,545 A | | 8/1988 | Marshall et al. |
| 4,829,306 A | | 5/1989 | Gjessing et al. ........... 342/159 |
| 4,858,124 A | | 8/1989 | Lizzi et al. |
| 4,864,307 A | | 9/1989 | Potage et al. .............. 342/192 |
| 4,975,704 A | * | 12/1990 | Gabriel et al. ............. 342/25 |
| 4,992,797 A | | 2/1991 | Gjessing et al. ........... 342/192 |
| 5,047,968 A | | 9/1991 | Carrington et al. |
| 5,068,664 A | | 11/1991 | Appriou et al. ............. 342/90 |
| 5,068,666 A | | 11/1991 | Voles ...................... 342/192 |
| 5,072,314 A | | 12/1991 | Chang |
| 5,122,803 A | | 6/1992 | Stann et al. ................ 342/25 |
| 5,159,474 A | | 10/1992 | Franke et al. |
| 5,339,080 A | | 8/1994 | Steinway et al. ............ 342/22 |
| 5,345,242 A | | 9/1994 | Roberts et al. ............. 342/159 |
| 5,446,461 A | | 8/1995 | Frazier ..................... 342/22 |
| 5,451,961 A | | 9/1995 | Rubin et al. ............... 342/159 |
| 5,469,176 A | | 11/1995 | Sandler et al. ............. 342/375 |
| 5,502,444 A | | 3/1996 | Kohlberg ................... 342/22 |
| 5,539,412 A | | 7/1996 | Mendelson ................ 342/192 |
| 5,546,084 A | | 8/1996 | Hindman ................... 342/25 |
| 5,561,431 A | | 10/1996 | Peele et al. ................. 342/90 |
| 5,563,601 A | | 10/1996 | Cataldo .................... 342/25 |
| 5,563,604 A | | 10/1996 | Brandao et al. ............ 342/159 |
| 5,594,450 A | | 1/1997 | Schober .................... 342/159 |
| 5,612,700 A | | 3/1997 | Tucker ..................... 342/90 |
| 5,614,907 A | | 3/1997 | Kreitmair-Steck et al. .... 342/25 |
| 5,659,318 A | | 8/1997 | Madsen et al. ............. 342/25 |
| 5,675,468 A | | 10/1997 | Chang |
| 5,675,663 A | | 10/1997 | Koerner et al. |
| 5,721,694 A | | 2/1998 | Graupe |
| 5,729,465 A | | 3/1998 | Barbaresco |
| 5,780,775 A | | 7/1998 | Yu |
| 5,790,702 A | | 8/1998 | Yoshimura |
| 5,848,193 A | | 12/1998 | Garcia |
| 5,867,118 A | | 2/1999 | McCoy et al. .............. 342/90 |
| 5,909,190 A | | 6/1999 | Lo et al. ................... 342/159 |
| 5,910,785 A | | 6/1999 | Normant ................... 342/25 |
| 5,936,552 A | | 8/1999 | Wichgers et al. |
| 5,959,566 A | | 9/1999 | Petty ........................ 342/25 |
| 5,960,097 A | | 9/1999 | Pfeiffer et al. |
| 6,011,625 A | | 1/2000 | Glass |
| 6,038,337 A | | 3/2000 | Lawrence et al. |
| 6,046,695 A | | 4/2000 | Poehler et al. .............. 342/25 |
| 6,070,461 A | | 6/2000 | Gjessing et al. |
| 6,150,972 A | | 11/2000 | Bickel et al. ............... 342/25 |
| 6,173,066 B1 | | 1/2001 | Peurach et al. |
| 6,252,754 B1 | | 6/2001 | Chaudhry |
| 6,288,776 B1 | | 9/2001 | Cahill et al. |
| 6,333,986 B1 | | 12/2001 | Petty |
| 6,337,654 B1 | | 1/2002 | Richardson et al. ......... 342/90 |
| 6,347,264 B2 | | 2/2002 | Nicosia et al. |
| 6,377,206 B1 | | 4/2002 | Petty ........................ 342/159 |
| 6,384,766 B1 | | 5/2002 | Ulander ..................... 342/25 |
| 6,441,376 B1 | | 8/2002 | Glass et al. |
| 6,452,532 B1 | * | 9/2002 | Grisham .................... 342/25 |
| 6,492,932 B1 | | 12/2002 | Jin et al. ................... 342/25 |
| 6,552,678 B1 | * | 4/2003 | Adragna .................... 342/25 |

OTHER PUBLICATIONS

Bruce P. Bogert et al., "The Quefrency Alanysis of Time Series for Echoes: Cepstrum, Pseudo–Autocovariance, Cross–Cepstrum and Saphe Cracking" Brown University, Jun. 11–14, 1962, pp. 209–243.

Alan V. Oppenheim et al., "The Importance of Phase in Signals", 1981, pp. 529–541.

Liberty Instruments, Inc., "Reflecting on Echoes and the Cepstrum: A Look at Quefrency Alanysis and Hearing", Jan. 24, 2000, 11 Pages (1–10 and 1 of 1).

Azriel Rosenfeld et al., "Digital Picture Processing" Second Edition vol. 1, 1982, 7 Pages (pp. 126–131).

William H. Press et al., "Numerical Recipes in Fortran", The Art of Scientific Computing, Second Edition, Cambridge University, pp. 584–599.

Carrara, Walter G., "Spotlight Synthetic Aperture Radar", Artech House, Inc. 1995, pp. 237–243.

4.2 Inverse Image Filtering, Author Unknown (XP–002154117).

Bruce Chapman, "SAR Interferometry and Surface Change Detection", II. Basic principles of SAR Interferometry, Apr. 29, 2003, pp. 1–9.

* cited by examiner

METHOD AND APPARATUS FOR COLLECTION AND PROCESSING OF INTERFEROMETRIC SYNTHETIC APERTURE RADAR DATA

RELATED APPLICATIONS

This application claims priority from U.S. Provisional Patent Application Serial No. 60/448,020, filed on Feb. 18, 2003, which is hereby incorporated by reference in its entirety.

FIELD OF THE INVENTION

The present invention relates to a system and method for collecting image data for synthetic aperture radar interferometry (IFSAR), and more particularly to the positioning and operation of a plurality of space vehicles configured to collect image data for IFSAR processing.

BACKGROUND OF THE INVENTION

Interferometric SAR systems on aircrafts have long been used to make height maps of the earth's surface. Typically the aircraft flies over a targeted region along a flight track to collect data. An antenna on the aircraft transmits electromagnetic pulses, which are reflected off the target area and then received by the antenna using a signal receiver. The image data collected by each antenna is then used to create a two dimensional image of the targeted region from the perspective of the collecting antenna. Interferometric SAR technology takes advantage of the coherent interference of the two 2D images from the two antennas. In particular, SAR interferometry employs the phase difference resulting from the relatively small difference in the slant range from a point in the targeted region to the two antennas to extract data for a third dimensional parameter. The third parameter is preferably the elevation or height variation of the targeted area. This elevation information allows a 3-dimensional topographic map to be obtained.

In the aircraft version of a interferometric SAR system, physically separated antennas may be used bistatically with a single transmitter. Although the antenna separation is of necessity small, the interferometric baseline length relative to the imaging range is satisfactory.

In another type of SAR system, a pair of space vehicles, such as satellites, may be employed to collect SAR image data for interferometric processing. Each space vehicle is equipped with an antenna to collect reflected energy from the targeted region. With satellite IFSAR, the long imaging ranges from low-earth orbit dictate the need for substantial baselines (typically on the order of mile or so) to obtain good performance. With satellite IFSAR, obtaining sufficiently long baselines can be difficult because it is not practical to connect two space vehicles with booms or tethers of sufficient length, and with unconnected space vehicles, the relative movements of the antennas may be difficult to monitor and control.

It has further been observed that topographic information is not obtainable if the surface of the targeted area moves or changes between the two SAR image data collections causing decorrelation of the SAR image data. For example, wind can cause branches of trees and bushes to move so that no topographic data can be derived from that part of the scene as a result of the decorrelation. If the collections are separated too much in time, even normal vegetative growth can prevent the generation of topographic data.

SUMMARY OF THE INVENTION

Disclosed herein is a system and method for topographical image data collection by two or more space vehicles in planetary orbit. Included as part of the system may be a first space vehicle configured for emitting electromagnetic energy towards at least one region of interest (ROI) and receiving and storing energy reflected therefrom as a first image data set.

Further included in the system is a second space vehicle moving in an aligned orbital path relative to the space vehicle. The second space vehicle is also configured to emit electromagnetic energy towards the at least one ROI at substantially the same time as the first vehicle and collect the reflected energy. The timing of the relative pulse emissions is controlled to minimize decorrelation effects in a SAR image. The collected energy is then storable as a second image data set for the ROI. Because of the relative proximity of the vehicles while in their orbital track, the system is further configured to control the timing of electromagnetic pulse emission so as to be substantially non-interfering with the image data collection process for each space vehicles.

Further, included in the system may be a controller in communication with first and second space vehicles. The controller may be configured to control the emission of pulses from the vehicles over a predetermined period of time. This controller may be locatable in either the first or second space vehicle or be incorporated in a ground station, which is in communication with either or both of the space vehicles.

In one configuration of the invention the first and second space vehicles are configured to emit the electromagnetic pulses in a manner so that the direct and bistatic pulse do not interfere with the collection by the other space vehicle. Still further, the timing of the emission of the electromagnetic pulses for both vehicles may be such that neither the direct and/or bistatic pulses are received by the other vehicle during a receive window for collecting monostatic pulses which comprise the image data. For example, one way to avoid interference from direct and/or bistatic pulses is to time the emission of electromagnetic pulses so that they are received by the other space vehicle while that space vehicle is emitting its own electromagnetic pulse, or during gaps between receive windows where there is no other activity.

In another configuration of the invention, the first and second space vehicles may be further configured to emit electro-magnetic pulses according to one or more preset timing models. Any timing model may be configured such that a predetermined number of pulses are identified to be emitted during operations. A time may then be assigned for emission for each pulse relative to the first emitted pulse. Such a timing model may assume that the vehicles emit pulses substantially simultaneously.

The central controller described above may be further employable for controlling the relative positions of the first and second space vehicles. Still further, the first and second space vehicles may be configured to collect image data for the at least one ROI from a variety of different grazing angles as well as squint angles. Preferably, the grazing angles may vary between approximately 20 and 48° while the squint angles may vary from approximately 30° to 150°. To minimize decorrelation effects, the radar pulses are separated approximately $10^{-4}$ to $10^{-3}$ sec, to provide near simultaneous data collection, while at the same time avoiding interference between the space vehicles.

In operation, a first space vehicle is directed along a first orbital track relative to one or more ROI's for which image data will be collected. A second space vehicle is directed along an aligned orbit relative to the first space vehicle, the aligned orbit also passing relative to at least one ROI so that image data can be collected by the second space vehicle. As the first and second space vehicles move along their orbital track, each emits electromagnetic pulses towards the ROI's substantially simultaneously and collects and stores the reflected energy for image data processing. When a sequence of pulses are to be emitted for one or more ROI's, both the lead and trail space vehicles are configured to emit the electro-magnetic pulses in a manner which is substantially non-interfering with the collection of reflected monostatic energy by the other vehicle.

In particular, the electromagnetic pulse emission by the first and second space vehicles is controlled such that direct and bistatic pulses received by the other space vehicle do not interfere with the receive window of that particular vehicle. More specifically, the electromagnetic pulse emission by either the first or second space vehicle is timed such that it is received by the other vehicle at times other than the receive window for collecting monostatic energy. The emission of pulses may be controlled by onboard systems or in response to received signals from remote sources such as other space vehicle and/or a ground station. These control signals may be generated as part of a pulse timing model. The space vehicles may transmit electromagnetic pulses in response to receipt of a control signal or may emit the pulses as part of a pre-programmed timing model incorporated into one or both of the space vehicles. In one configuration of the invention, the timing model is configured such that if the range distance to the ROI is known and the separation between the space vehicles is known, a model may be established whereby the pulse emissions are timed such that the bistatic and direct pulses are received by the other vehicle at times other than during a receive window for that vehicle.

During operations, the lead and trail space vehicles may be positionable to emit the electromagnetic pulses at a number of different grazing and squint angles. In particular, the grazing angles may range between approximately 20° and 48° while the squint angles may range from approximately 30° to 150°. Still further, in order to minimize decorrelation effects, the radar data pulses captured for the first and second image data sets may be separated by approximately $10^{-4}$ to $10^{-3}$ seconds. This minimal time between data collection is advantageous in such uses as characterizing portions of a planetary surface which are normally in motion.

DETAILED DESCRIPTION

Figure 1:
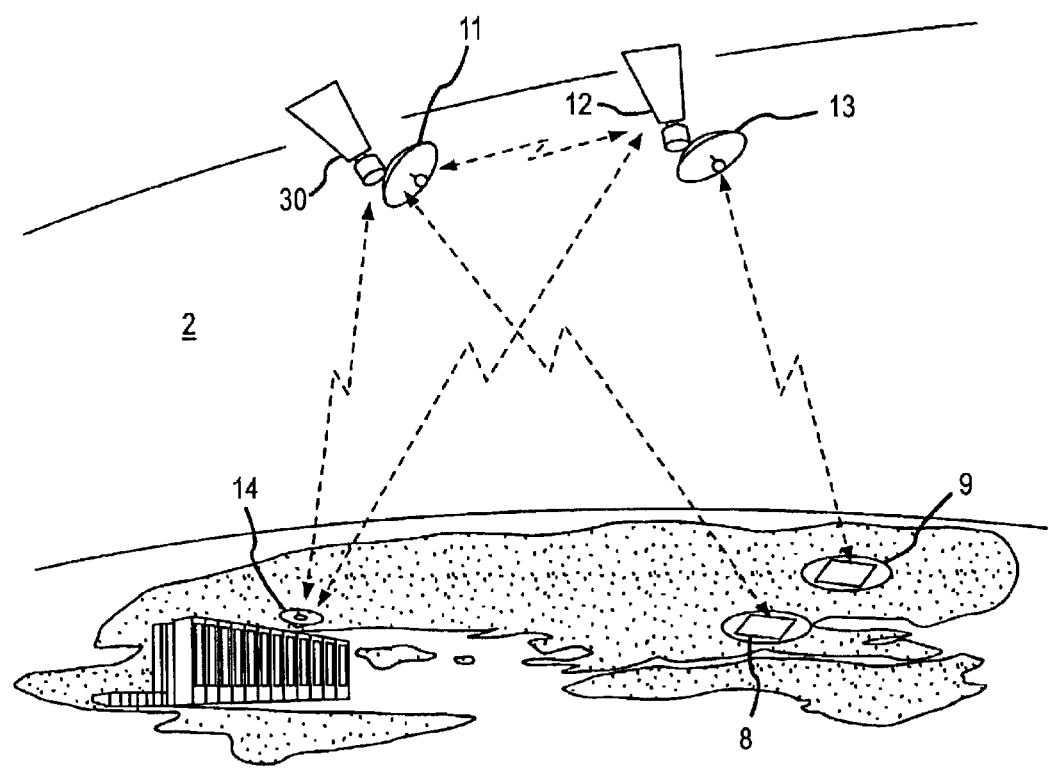
FIG. 1 discloses one system embodiment of the present invention.

FIG. 1 illustrates an exemplary system embodiment for the present invention. The system includes at least two space vehicles 10 and 12, such as satellites, each having a combination collection and transmission antenna, 11 and 13 respectively, mounted thereon for periodic transmission of electromagnetic energy towards regions of interest (ROI) 8 and 9 on a planetary surface, such as Earth, and the collection of a portion of the reflected energy. Antennas 11 and 13 may be configured for operation in a strip map mode, e.g., where the antennas are positioned relative to the space vehicles to maintain a substantially common path over the ROI's during imaging operations. The strip map mode allows a low cost collection configuration which avoids the need to articulate the antennas as is needed for spotlight imaging. It also gives the large area rate needed for global mapping.

In an exemplary configuration for the nominal mapping mode, the system may produce a three 3-meter along/track (AZIMUTH) resolution and ⅓-meter cross-track (range) resolution. This unequal initial resolution permits multi-looking in range to improve the overall signal-to-noise ratio. The final maps and images created in this mode have 3-meter squares pixels and 3-meter elevation post spacing.

In one configuration of the invention, in order to get a 3-meter along track resolution, the antenna may be configured with a horizontal dimension of approximately 6-meters. The vertical dimension, which is adjusted to satisfy the range and azimuth ambiguity constraints, is somewhat less than one meter for an antenna area of about 3.5 square meters. When this type of antenna is used for spotlight or stripmap imaging, the area collection rate is in the order of 130 square nautical miles per second.

The space vehicles may be configured to operate independently, each exchanging signals with a remote location or they may operate in a master-slave relationship where one spacecraft controls the other. As part of their independent operations, the space vehicles are also configured to emit and collect the electro-magnetic energy in a monostatic manner, that is, each space vehicle only collects and stores its own energy reflected from the ROI.

In one configuration, the radars on each of these space vehicles operate at an X-BAND center frequency, which is a compromise between atmospheric losses, radar cost, area coverage, and resolution post spacing. Other frequencies may be employable depending on the various technologies employed in the space vehicles as well as the type of mapping to be performed (e.g. being unvegetated earth, or including vegetated features).

The radar systems on the lead and trail space vehicles are further configured to collect image data in a monostatic manner, that is, two completely independent transmitter/receiver combination are employed to collect image data. As is known, as long as both radar systems are stable and coherent, then complex images of the same regions can be conjugate multiplied pixel by pixel to obtain the interferometric phase difference to within an un-important constant introduced by transmitter/receiver independents.

The exemplary system further includes a ground station 32 for transmission of control information (e.g., space vehicle positioning information) and/or the downloading of synthetic aperture radar interferometry (IFSAR) image data collected by the antennas on those space vehicles. In one configuration of the invention, the ground station may be configured to communicate with either and/or both of the space vehicles. The ground station may be further configured to communicate with relay satellites which in turn exchange signals with one or more of the space vehicles. In the configuration where a master/slave relationship is established between the space vehicles, the ground station may communicate with only one space vehicle. Processing of the IFSAR image data may be performed at the ground station or at other facilities in communication therewith.

The system configured herein performs the determination of terrain height using IFSAR. According to the system, the first and second space vehicles are positioned in a aligned orbit with one vehicle trailing the other. During operations, the lead and trail vehicles collect image data from the same ROI's from substantially the same orbital track relative to the ROI. The earth's rotation while the trail vehicle moves into position creates the condition so that interferometry can be performed on the image data collected by the lead and trail vehicles. One way to control the performance of the system described herein is to vary the separation of the lead and trail vehicles along the aligned orbital track. More specifically, varying this separation controls the amount of planetary rotation between when image data sets are collected. Because the latitude of the ROI affects the amount an ROI moves relative to an orbit during a selected time period, the separation of the vehicle may be varied to account for this.

In determining a selected vehicle separation, various performance predicting tools may be employed. A first performance predictor is ambiguous height. In short, ambiguous height is the out-of-plane height for corresponding points in the first and second data sets is which corresponds to $2\pi$ of interferometric phase differences. Ambiguous height is given by:

$$h_{amb} = 2\pi \cdot K_{\phi h}$$

Where $K_{100\ h}$, the interferometric phase difference to out-of-plane target height is expressed by:

$$K\phi h = \frac{\lambda}{4 \cdot \pi} \cdot \frac{1}{\left[\left(\frac{N1}{N1 \cdot F} - \frac{N2}{N2 \cdot F}\right) \cdot \frac{R2}{|R2|}\right]}$$

Where N1 and N2 are the slant-plane normal vectors for the two images, F is the normal to the common focal plane, and R2 is the mid-aperture slant range to pixel in the image which is not the one chosen as the plane reference.

The slant plane normals are given by:

$$N = \frac{V \times R}{|V \times R|}$$

Where V and R are the mid-aperture satellite velocity and range vectors respectively.

As is known elevation in a scene may be determined by calculating the phase difference between the same point in two images.

Ambiguous height can be readily computed by the above expressions for nearly any imaging geometry. As long as the ambiguous height value is kept between approximately 2 and 50 meters, the desired performance can be achieved from the standpoint of height error variants and ease of phase unwrapping when performing the interferometry.

For certain orbital tracks for the space vehicles relative to the ROI, a second performance predicting tool may be employed. This tool is the establishment of an interferometric baseline which is the amount the slant range between the lead and trail vehicle to a point in the ROI changes due to planetary rotation. The use of the interferometric baseline will be discussed in greater detail below.

Figure 2A:
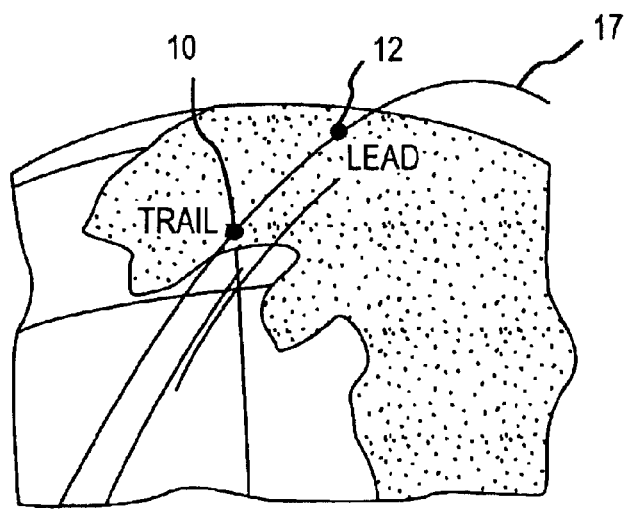
FIGS. 2a–c disclose views of the orbital tracks within which the lead and trail space vehicles may travel.
Figure 2B:
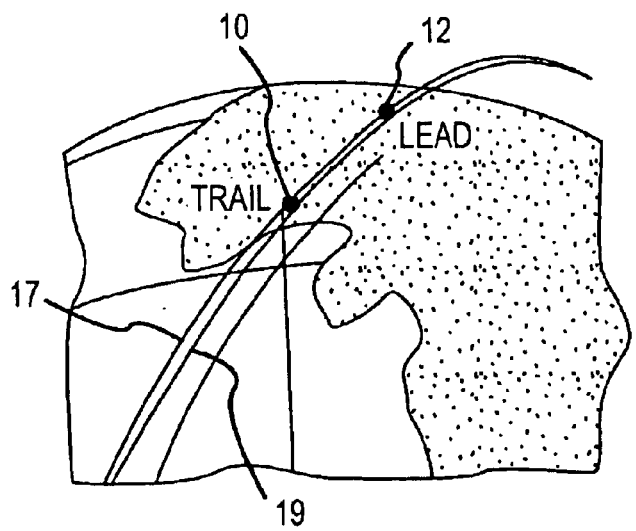
Figure 2C:
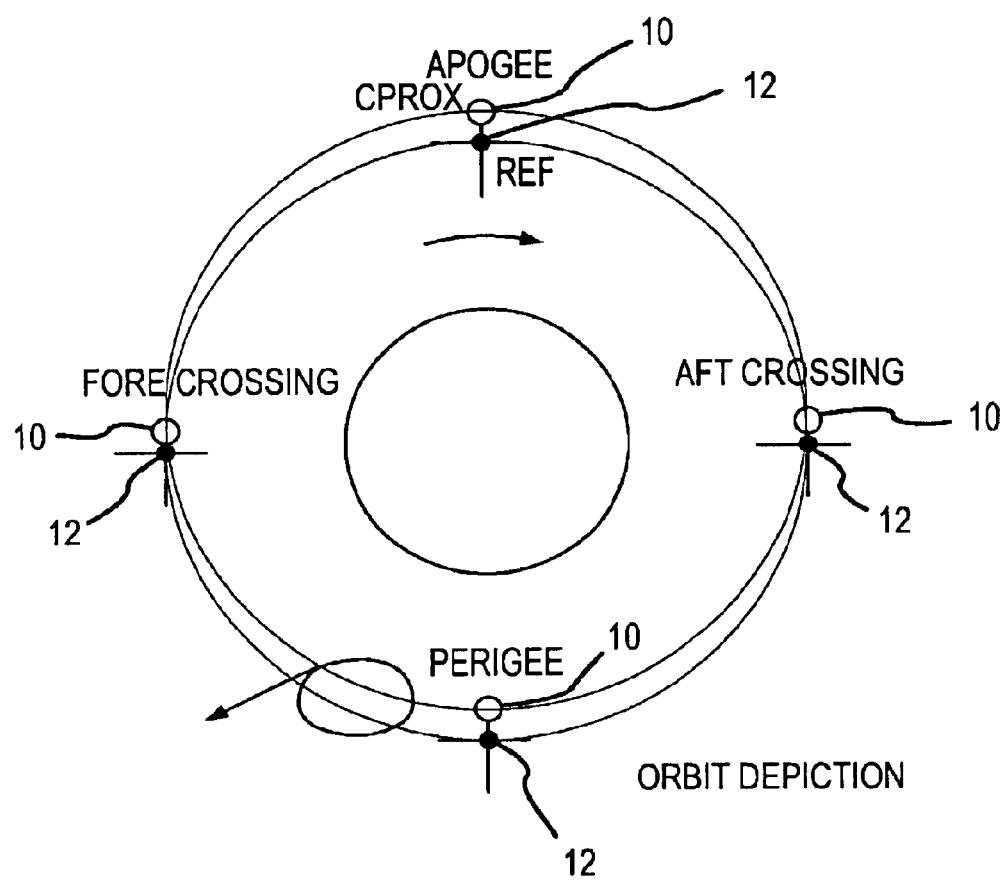

Disclosed in FIG. 2a–c are diagrams which disclose relative orbital configurations for the lead and trail space vehicles. In particular, disclosed in FIG. 2a are the lead vehicle moving in a first orbital track 17 while the trailing vehicle is in an aligned orbital track which in this case, is an identical track. The vehicles in this configuration are typically at the same altitude, with the only difference being a temporal separation. As will be discussed below, the separation of the space vehicles may then be varied based on the latitude of the ROI.

In certain situations, the formation of the space vehicles may be modified to improve spotlight mode area rate if collection is desired to be performed over the entire access region. In this modified formation, the aligned orbital track 19 of the trailing space vehicles may be drifted slightly away from that of the lead vehicle. As is shown in the FIG. 2b, this approach allows the vehicles to increase their in-track separation to avoid any overlap in their access region. The slight orbit plane separation is selected to cancel out the additional planetary rotation that would be experienced during the longer delay between their respective collection time, thus maintaining the desired interferometric baseline.

Another possible orbital configuration is to have the aligned orbital track for the trailing vehicle 10 to be slightly elliptical with reference to the first orbital track of the lead vehicle 10. This is shown in FIG. 2c. As is seen, the aligned orbital tack apogee/perigee altitudes are defined by the vertical offset limits placed on the trail vehicle. The orbital planes of the lead and trail space may be further offset such that an intersection of the planes occurs at relative positions of maximum separation, such as the apogee and perigee. The aligned orbital track maintains the period of the first orbital track. In this orbital configuration a characteristic relative motion is established in which the trail space vehicle traces an elliptical circumnavigation path about the lead space vehicle.

Figure 3A:
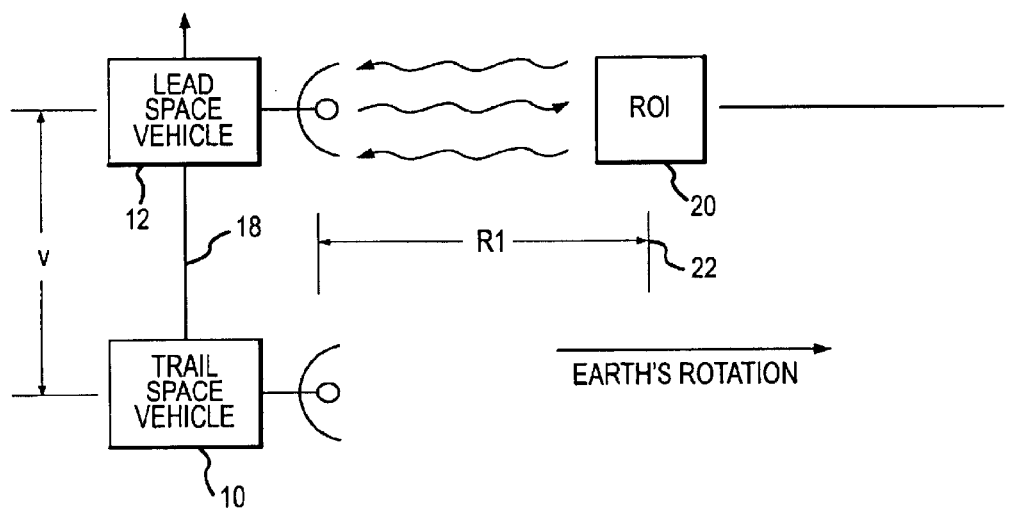
FIGS. 3a and b show slant plane views of the lead and trail space vehicles in a polar orbit as they move by and collect image data from a region of interest.

As was mentioned above, the system and method described herein takes advantage of the planetary rotation in order to create a condition to perform interferometry between first and second image data sets for a particular ROI. As was mentioned above, an interferometric baseline may be employed to predict the performance of the system. Provided in FIGS. 3a and b are views which show in particular how the interferometric baseline changes between the data collection of the leading and trailing space vehicles because of planetary rotation. The view is looking into the range plane where the squint angle for data collection is 90 degrees. As is seen in FIG. 3a, leading space vehicle 12 and trailing space vehicle 10 are moving in substantially the same orbital track 18 relative to the planet they are orbiting. In this case the orbit of the vehicles is a polar one, where the orbital plane is substantially perpendicular to the lines of latitude at their intersection.

As the leading space vehicle 12 moves to a predetermined position along the first orbital track relative to the ROI, electromagnetic energy is emitted by the transmission antenna towards the ROI 20. Reflected energy 22 from the ROI is collected by the collection antenna of leading space vehicle 12 and is stored as a first image data set for a 2D image of he ROI. In this view, the range from the leading space vehicle to a reference point in the ROI is indicated by R1.

Figure 3B:
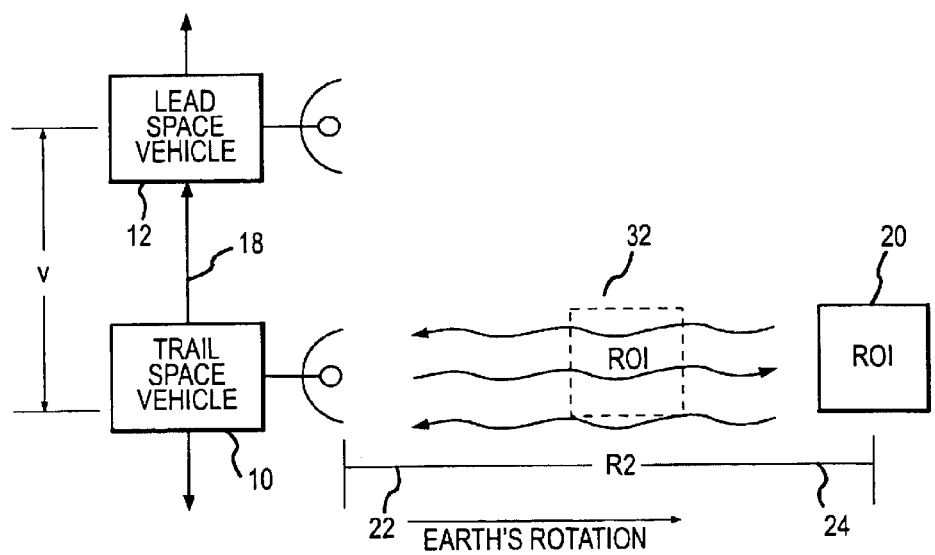

When the trailing space vehicle moving along the aligned orbital track reaches the same relative position along the orbital track (the same latitude in this case), as shown in FIG. 3b, it emits electromagnetic energy from its transmission antenna towards the ROI and 10 collects the reflected energy in order to create the second image data set for use in interferometric processing. In this view the range from the trail space vehicle to the ROI reference point is indicated by R2.

As is seen, in the time it has taken for the lead space vehicle to collect the first image data set and then for the trailing satellite to move to the same relative collection point, the planet has rotated, thus creating an interferometric baseline. This interferometric baseline may be calculated by R2–R1. It should be noted that the relative positions of the space vehicles and the ROI of FIGS. 3a and b are exaggerated in order to make clear how these processes are carried out. As was mentioned above, for earth, the value of R2–R1 is typically one nautical mile.

Figure 4A:
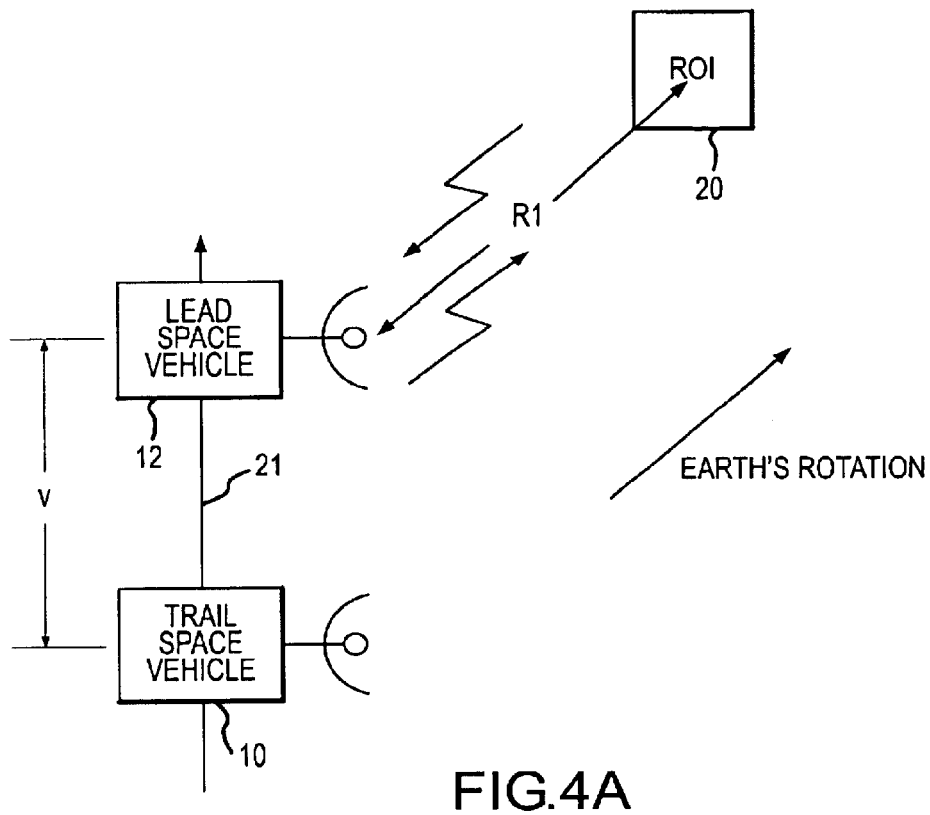
FIGS. 4a and b show a slant plane view of the lead and trail space vehicles in a non-polar orbit as they move by and collect image data from a region of interest FIG. 5 discloses a flow chart which describes the collection and processing of information for the creation of a topographical image.
Figure 4B:
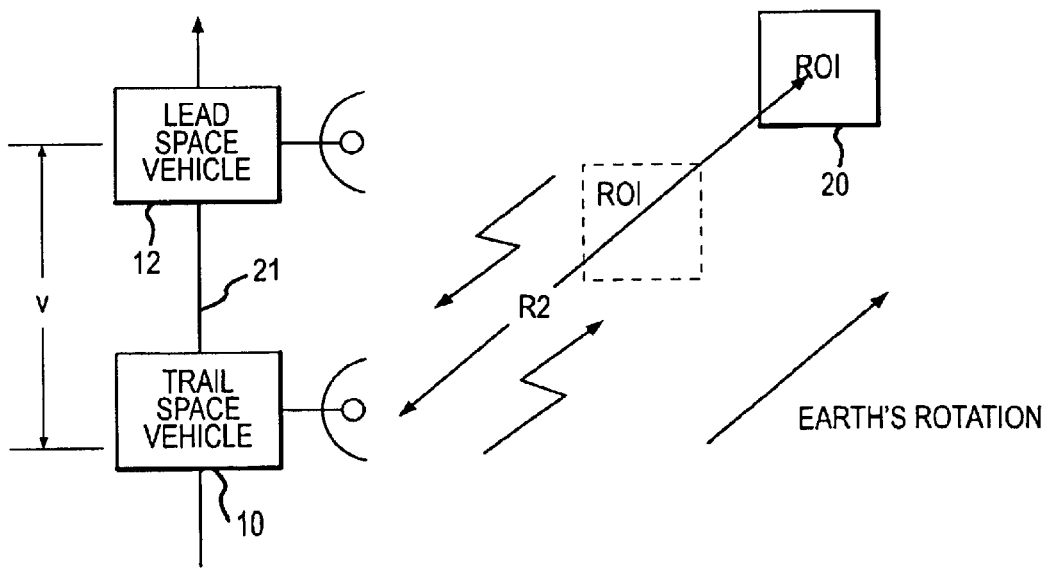

Disclosed in FIG. 4a and 4b is a range plane view of the lead and trail space vehicles image data when moving in a common orbital track which is non-polar. As can be seen, the orbital track, in contrast to which is shown on FIGS. 3a and 3b, is not moving in a direction which is perpendicular to the lines of latitude for the planet being imaged. In the situation where the space vehicles are moving in a non-polar orbit, electromagnetic energy reflected from the ROI 20 is at a known squint angle within the range plane. This squint angle may be established once the orbital track is known.

As can be seen in FIG. 4a lead and trail space vehicles 12 and 10 respectively are moving along the non-polar orbital track 21, which is not perpendicular to the lines of latitude. When the lead space vehicle 12 reaches a particular latitude an electro-magnetic pulse is emitted and the reflected energy from the ROI 20 is collected at the squint angle established for the orbital track.

After the lead space vehicle collects the image data, the lead and trail space vehicles, 12 and 10 respectively, move along orbital track 21. The trail space vehicle will now collect image data for the ROI 20. This is performed when the trail space vehicle reaches substantially the same planetary latitude from which the lead space vehicle collected image data. At this point the trail space vehicle 10 emits its electromagnetic pulse and collects the reflected energy. As can be seen, the range plane for data collection by the trail space vehicle is different than the range plane for the lead space vehicle in collection of the energy with the line of sight still being along the line of latitude for the ROI. With the different range planes established by the lead and trail vehicles for collecting image data from the ROI, a condition to perform interferometry is created. This is confirmed by calculation of an ambiguous height.

Returning again to FIG. 3a and b, it is seen that the leading and trailing satellites have an orbital path separation of V. For purposes of the description herein, this value is measured either in time or distance. As was mentioned above, this separation is selected so that the desired ambiguous height and/or interferometric baseline is created by planetary rotation. As is well known, points on the equator of a planet rotate at a greater speed than points near the poles. As such, in order to maintain a desired performance the separation should be varied. During operations, the separation of the space vehicles may be varied for each band of latitude to be mapped. That is, when a particular latitude band for a planet has been mapped, the separation may be changed for another latitude band. For example, a space vehicle/pair in polar orbit of earth with an elevation of 350 nautical miles and a separation of 16 nautical miles produces a one nautical mile baseline at the equator. To get the same baseline at latitude of 80°, approximately 100 nautical mile separation is required. By making these periodic separation changes, the entire land area of the Earth could be mapped with only a few orbital adjustments.

Figure 5:
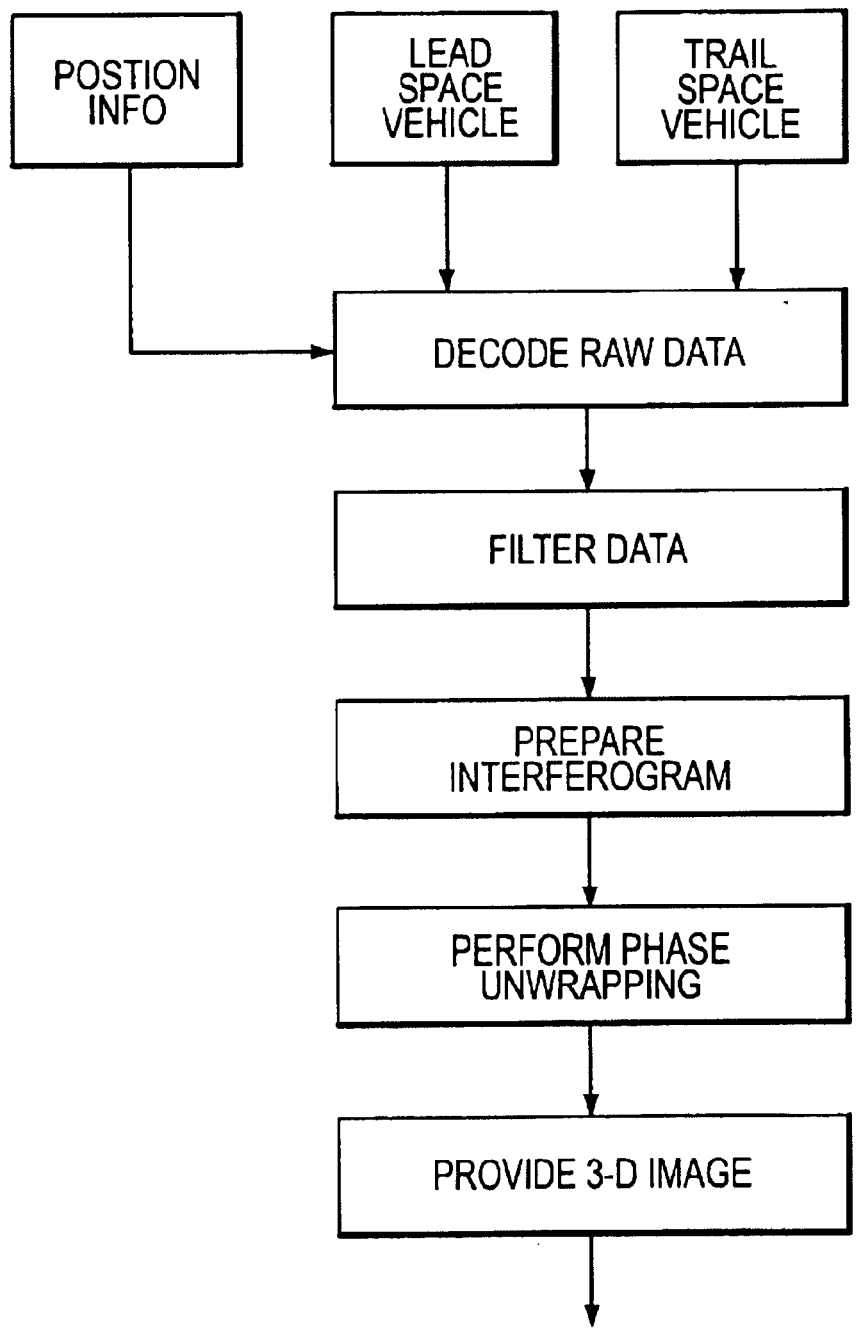

Once the first and second image data sets for an ROI are collected by the lead and trail space vehicle, this data may be transmitted to the ground station for 2D image formation and interferometric processing. A flow chart describing the steps performed is provided in FIG. 5. Upon the lead and trail space vehicles providing their image data, it is decoded with reference to position information for the particular satellite. Various things such as range compression and band pass filtering are performed in order to generate a pair of detected 2D images for ROI. When generating an interferogram, the pre-detection complex images are conjugate multiplied pixel by pixel to extract the interferometric phase. An additional step in the processing is to remove from each pixel product the phase which would have been present if a scattering center with a zero height had been present at the pixel location. After this reference has been removed the resulting phase can be transformed to out-of-plane height For the collection geometry of interest, the phase-to-height conversion factor, which is determined from the collection geometry, remains constant in the along-track direction but changes slowly in the cross-track (range) direction. Accordingly, the conversion is a simple multiplication by a factor which is determined from the collection geometry.

In the configuration of the invention described above, the space vehicles typically occupy a lead-trail formation within the same orbital plane. However, this formation can be easily modified to improve spotlight mode rates if collection is desired to be performed over the entire access region. In this modified formation, the aligned orbital track of the trailing vehicle is drifted slightly away from that of the lead vehicle as was shown in FIG. 2b. A view of this configuration is further provided in FIG. 6. As is seen, leading space vehicle 32 is traveling along first orbital track 35, while trailing space vehicle 30 travels along aligned orbital track 37. In this formation, the vehicle separation V is greater than it normally would be than if the space vehicles were traveling along the same orbital track. In this operational approach, the vehicles have increased their separation to avoid any overlap of their access region when collecting image data.

Figure 6:
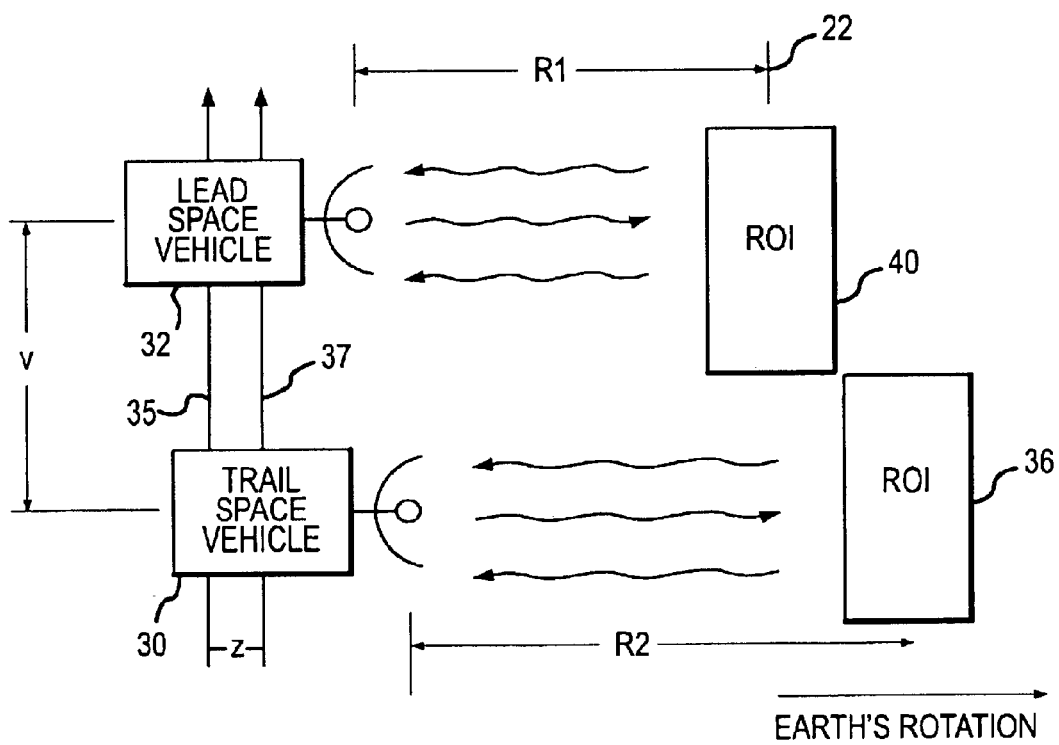
FIG. 6 discloses a downward looking view of the lead and trail space vehicles when the trail space vehicle is collecting image data in an offset orbit track.

As seen in FIG. 6, while lead space vehicle 32 is collecting SAR image data for (ROI) 40, trailing vehicle 30 collects information for ROI 36 and the two ROI's do not overlap.

The slight orbital plane separation is selected to cancel out the additional earth rotation that would be experienced during the longer delay between their respective collection times, thus maintaining the desired interferometric baseline. The interferometric baseline can be calculated from R2–R1+ Z. As with the space vehicle separation, this offset is variable depending on the latitude of the ROI.

In operating the imaging system described herein, it is known that the performance of the system is based on the error in the height measurements and area coverage. In order to predict the performance of the system described herein, these above described metrics may in turn be based on several fundamental quantities which include: signal to noise (SNR performance), phase-to-height conversion and antenna dimensions as they relate to collection rates and the spatial resolution.

With regards to the signal noise ratio, an expression for SNR of diffuse terrain known in the art may be employed, and is represented by the following equation:

$$SNR = \frac{P_p \cdot \tau \cdot PRF \cdot Go^2 \cdot \lambda^3 \cdot Wrs \cdot \gamma \cdot \tan(\phi g)}{2 \cdot (4 \cdot \pi \cdot R)^3 \cdot T_{sys} \cdot Vo}$$

Where:

| | |
|---|---|
| $P_p$ = | peak transmit power, |
| $\tau$ = | duration of the transmitted pulses, |
| PRF = | pulse repetition frequency, |
| Go = | one way antenna power gain, |
| $\lambda$ = | transmit wavelength, |
| Wrs = | slant range resolution |
| $\gamma$ = | terrain reflectivity, where $\sigma o = \gamma \sin(\phi g)$, |
| $\phi g$ = | grazing angle, |
| R = | mid-aperture slant range, |
| $T_{sys}$ = | system noise temperature, including atmospheric losses, |
| Vo = | along orbit satellite velocity. |

The above expression assumes side looking imaging and omits some near-unity factors which account for excess collection for side lobe weighting. The above expression may be applied for each of the images provided by the leading and trail space vehicles. When the two images are superimposed and added to produce a single image of the terrain, the SNR is improved by at least 3 dB, and when the range multilooking is done to square up the pixels, an additional SNR improvement of 10 Log(Nlook) is seen, where Nlook is the number of looks.

The area collection rate for side looking strip map operation is simply:

$$A = V_g \cdot \Delta R_g$$

Where $V_g$ is the along-track ground speed of the radar-carrying satellite and $\Delta R_g$ is the range extent of the ground strip which is imaged. The range swath is in turn given by:

$$\Delta R_g = \frac{k\lambda}{H_{ant}} \cdot \frac{R}{\cos(\phi g)}$$

Where k is an antenna efficiency factor, $H_{ant}$ is the antenna height, $\lambda$ is the transmit wavelength, R is the mid-aperture slant range to the swath center and $\phi g$ is the mid-aperture grazing angle.

With regards to the resolution, the spatial resolution of the images is important as it determines the elevation post spacing in the DEMs (digital elevation models) produced by the system. For side-looking strip map operations, the along track resolution is approximately half of the antenna dimension in that direction, or:

$$W_a = \frac{k \cdot L_{ant}}{2}$$

Where again k is an efficiency factor and $L_{ant}$ is the antenna length.

The ground range resolution is given by the expression:

$$W_T = \frac{0.886c}{2 \cdot BW \cdot \cos(\phi g)}$$

Where c is the speed of light, BW is the bandwidth of the radar signal, and $\phi g$ is again the mid-aperture grazing angle.

In the system described above, it was seen that the lead and trail space vehicles with their monostatic image collection systems collect image data from the ROI at points in time which were separated so that the signals emitted from either satellite did not substantially interfere with the operations of the other space vehicles. One phenomena which may occur because of the amount of separation of the space vehicles along the orbital track is that there is some degree of temporal decorrelation of the images collected by the lead and trail space vehicles. According to another embodiment of the system described below, this decorrelation may be reduced by aligning the lead and trail space vehicles in substantially the same orbital track at a small separation and timing their emission of electromagnetic energy for a particular ROI to be substantially simultaneous. Typically, time separation for the collection of image data is typically $10^{-4}$ to $10^{-3}$ seconds. In this configuration, the orbital separation of the vehicles will establish the interferometric baseline for collection of IFSAR data.

The use of radar pulses closely spaced in time means that the scene movement between pulses is typically so small that it may be possible to realize usable topographic data from the collected SAR image data. This is analogous to the use of stroboscopic flash in photography which can have a "stopped motion" effect. The near-simultaneous collection of SAR image data may enable the successful generation of topographic data characterizing portions of a planetary surface which are normally in motion. An example of this is to characterize the surface of a body of water through determination of wave patterns. This information can be used as one of the means to assess the weather at the collected area.

In operation, the pair of space vehicles move along their orbital track and illuminate the same area of ground (ROI). As described above, each space vehicle has a monostatic imaging system. In this case the imaging system is configured to operate substantially simultaneously with the other. The two monostatic SAR images collected for each ROI are combined using interferometric processing to create an IFSAR image. In monostatic image collection systems, such as that described herein, a possible source of interference in data image processing may be signals emitted from the other vehicle. These signals typically fall within two categories. The first type of interfering signal being direct signals, which are signals emitted by one radar and collected by another without being reflected or otherwise redirected. The second type of interfering signal is a bistatic signal which is a radar signal emitted by the other vehicle which reflects off the ROI and is collected by the non-emitting radar.

Generally, according to the configuration of the invention described below, the collection geometry and radar pulse timing may be arranged so that when one space vehicle receives either the direct or bistatic pulses, it is not during a receive widow for collecting its own reflected monostatic energy.

As was disclosed in FIG. 1, the system typically includes first and second space vehicles 10 and 12 which are configured to communicate in some manner with ground station 14. The space vehicles are configured to periodically transmit the collected image data to ground station 14 for further interferometric processing. The space vehicles may also be configured to each communicate independently with the ground station or operate in some sort of master/slave relationship. One difference between the present embodiment and the embodiment described above, is that during operations, the first and second space vehicles will substantially simultaneously collect image data from a common ROI.

To understand the operation of the system described herein, a number of space-time diagrams are disclosed in FIG. 7, 8, 10 and 11 which visually describe the timing of signal emissions as well as their receipt by the other vehicle whether directly or bistatically. In particular, in each diagram "Time" is on the horizontal axis, while the vertical axis is the "Distance" an emitted signal covers. In the figures, the upper horizontal line represents a timeline for pulse emission by the lead vehicle while the lower horizontal line represents a timeline for pulse emission by the trail vehicle. The solid lines represent the duration of pulse emission for the lead vehicle while the dash lines represent the duration of pulse emission for the trail vehicle. The point in time in which pulses emitted by one vehicle is received by the other is represented by intersections of the lines.

As mentioned above, the goal of the system described herein is to time the emission of the electromagnetic pulse by a space vehicle at the same time that it is receiving electro-magnetic pulse energy emitted by the other vehicle. Solving this problem may be looked at as a two-step process. The first step is directed towards accounting for direct signals emitted by the other vehicle which are received by the vehicle of interest. The second step is accounting for bistatic signals which are emitted by the other vehicle, reflected from the ROI, and are received by the vehicle of interest.

Figure 7:
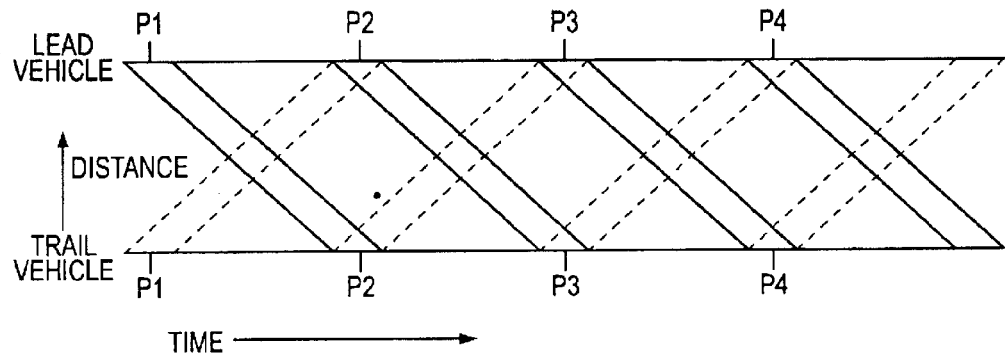
FIG. 7 discloses a space/time diagram which depicts the timing of the emission of radar pulses from the leading and trailing space vehicles as well as the receipt of the pulses from the other space vehicle.

The issues included with receipt of direct signals can be understood by review of the diagram of FIG. 7. In this example, the distance between the vehicles is known and is equal to the pulse repetition interval (PRI). If both radars transmit at the same time, each radar receives the others direct pulse at the same time it is transmitting its own new pulse. As such, the pulse emitted by the other vehicle is hidden.

In dealing with the bistatic signal, this can be hidden by choosing a collection geometry in which the bistatic range is an integer multiple of the distance between the radars so that the bistatic signal returns to each radar while that radar is transmitting a new pulse, rather than occupying part of the receive window. This is represented in the space time diagram in FIG. 8. In this diagram receipt of the bistatic signals by the other vehicles are represented by rectangular boxes positioned along the time line. As can be seen, each box includes a marking indicating the pulse from which it originated. In this situation it can be seen that, for example, pulse P1 from the trail vehicle will be received by the lead vehicle at the same time that the lead vehicle is emitting its third pulse.

Figure 8:
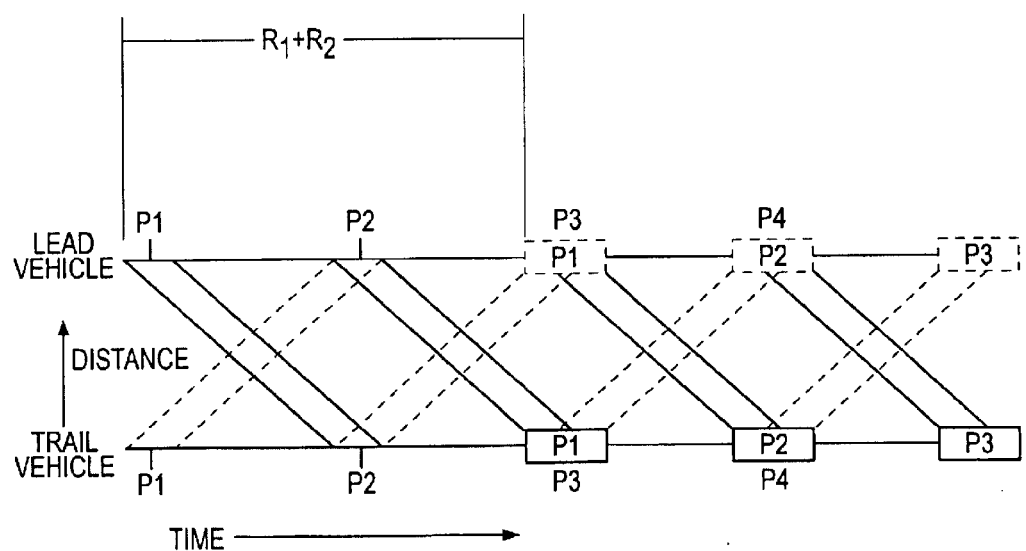
FIG. 8 discloses a space/time diagram which depicts the emission of radar pulses from the leading and trailing space vehicles as well as the receipt of direct and bistatic pulses from the other space vehicle.

To get results such as that shown in FIG. 8 certain collection geometries may be employed in establishing the geometries. It is understood that the 1-way slant range (in units of time) from radar n to the near corner of the image scene is $R_n$. In order for the monostatic signals to return within the receive windows, the following must be true:

$$|2R_1 - 2R_2| = PRI$$

Figure 10:
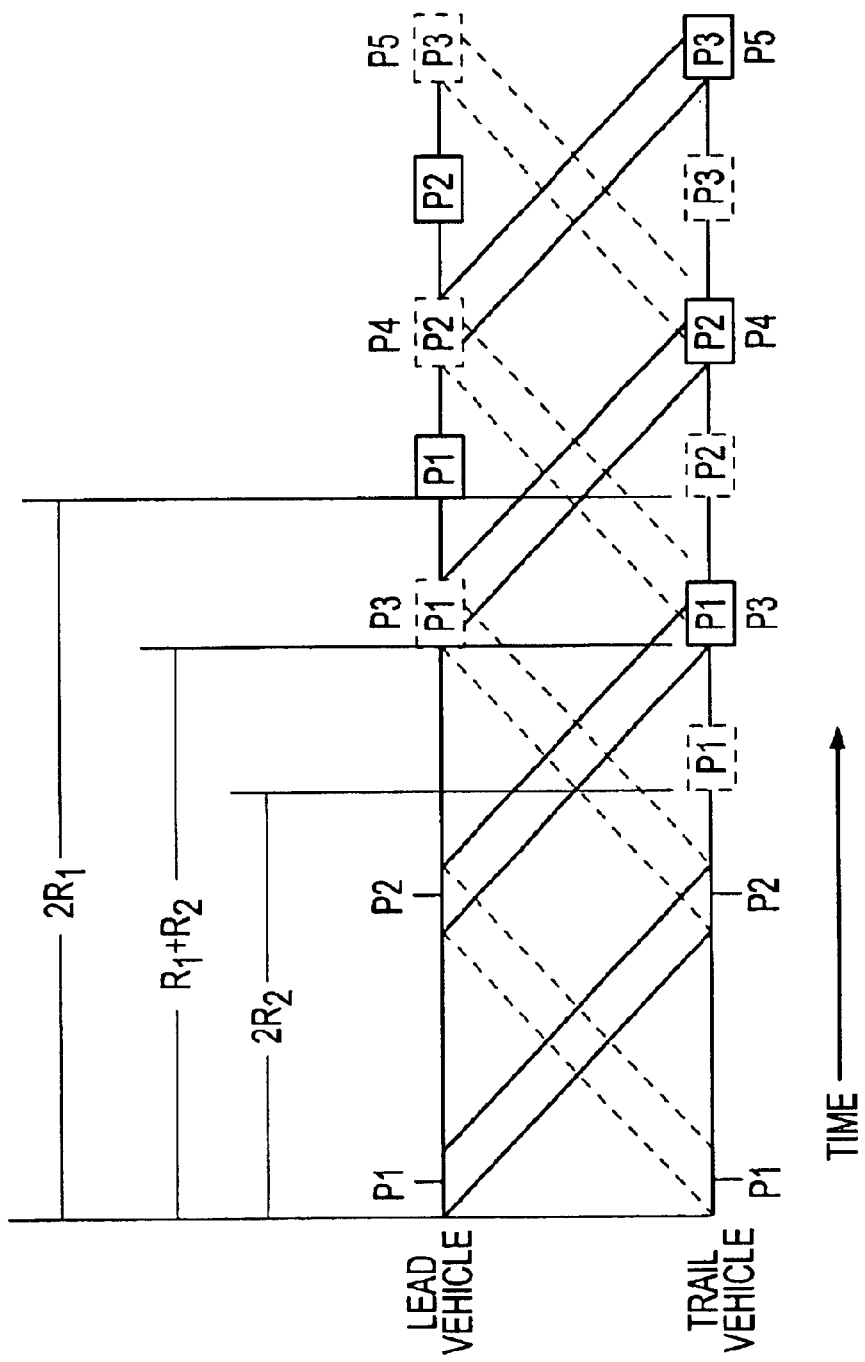
FIG. 10 is a graphical representation of a signal model which monostatic signals are received during the receive windows and by static signals are received during emission of a signal.

This relationship is shown graphically in the diagram of FIG. 10

Figure 9:
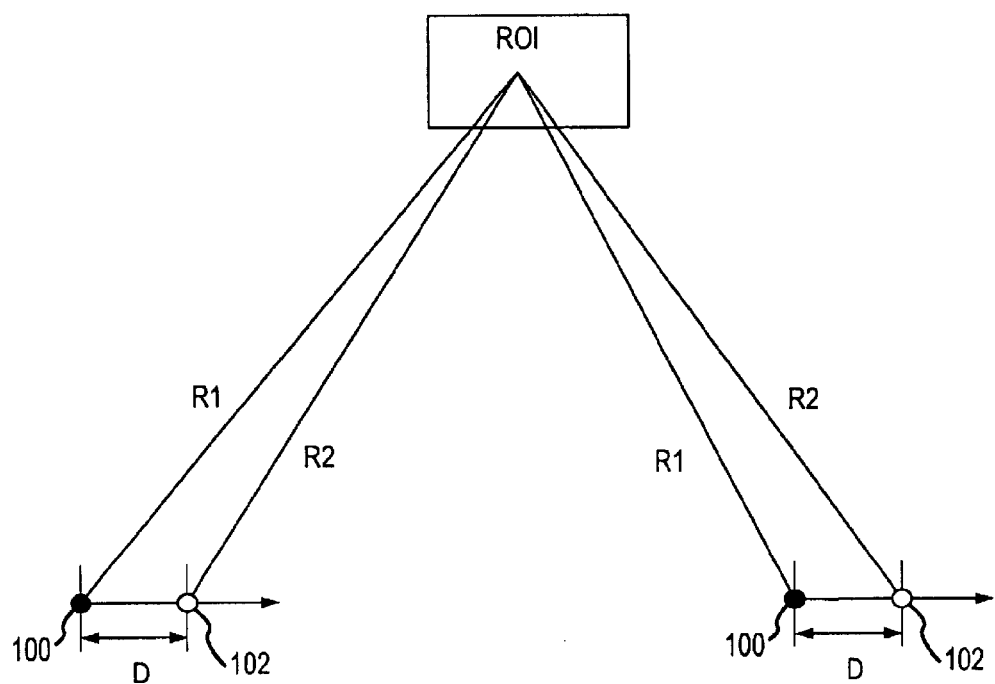
FIG. 9 discloses a diagram which discloses the point at which the leading and trailing satellite emit a direct pulse and receive a reflected signal.

The values of $R_1$ and $R_2$ may be better understood through the review of FIG. 9. Shown are two possible configurations of the leading and trailing space vehicles with regards to the region of interest. When vehicles 102 and 100 are collecting SAR data with a forward looking squint angle (forward of broadside) and a separation of D, $R_2$ will be slightly less than $R_1$. Conversely with a rearward looking squint angle (rearward of broadside), $R_2$ will be greater than $R_1$. Returning again to FIG. 10, because the PRI equals the distance between the radars (in units of time), no other integer multiple of the PRI will work on the right hand side of above equation. Zero would make the monostatic signal return at the same time as the bistatic signal, and 2 would only be possible if the ROI and space vehicles are along the same orbital path.

As was described above, D is the distance between the radars measured in units of time. In this particular case:

$$PRI = D, |2R_1 - 2R_2| = D,$$

where $R_1 + R_2$ = an integer multiple of D.

If D and $R_1$ are both given, then there are solutions for $R_2$ where $R_1$ is greater than $R_2$ forward of broadside) where $R_1$ is less than $R_2$ (rearward of broadside) or in a configuration when the space vehicles are side by side in slightly offset orbits.

In order to perform interferometric processing on a pair of IFSAR images, a limitation may be put on the separation of the vehicles along their common orbital path. This limitation is significant because the distance between the vehicles determines the PRI and therefore determines the duration of the receive window. The duration of the receive pulse may be described by T+S, where S is the time difference between the near and far corners of the ROI being imaged and T is the duration of the transmitted pulse. Since the received pulse must fit inside the receive window, certain limitations may be considered in the upper bound for the size of the ROI.

Other considerations in the system described herein is the azimuth resolution. The finer the azimuth resolution the longer the collection period, which means a greater variation of $R_1$ during the coherent collection. The duration of the receive window determines the maximum coherent collection period (hence the finest azimuth resolution) that may be used. To improve the azimuth resolution, the PRI may vary during the coherent collection period so that the receive pulse remains in the receive window even during a long coherent collection period.

According to the invention described herein a pulse timing model may be employed for controlling the PRI with respect to time during the coherent collection period. The purpose of the model is to keep the bistatic signal substantially centered between the adjacent receive windows. A determination must also be made as to whether or not the monostatic pulses would remain inside their respective receive windows. This rearward looking model is one solution to the issue of receipt of direct and bistatic pulses.

For the purposes of the present invention assume that the bistatic range $R_1+R_2$ is a linear function of time represented by:

$$(R_1+R_2)_n = a+(b-1)t_n$$

Where a and b are constants and $(R_1+R_2)_n$ is defined to be the time-of-flight of bistatic pulse n.

The leading edge of the nth transmitted pulse is received by the other radar at time $a+bt_n$. As was discussed above, the received pulse has a duration of T+S, where the center of this receive pulse lies at the time:

$$a + bt_n = \frac{T+S}{2}$$

Continuing with this analysis, the mid point between adjacent receive windows is the average of $t_n+D$ (the end of one receive window) and $t_n+1+T$ (the beginning of the next receive window). Therefore, the condition that the bistatic pulse be centered between adjacent receive window is:

$$a + bt_{n-N} + \frac{T+S}{2} = \frac{t_{n+1} + t_n + D + T}{2}$$

where N is the bistatic ambiguity number.

Figure 11:
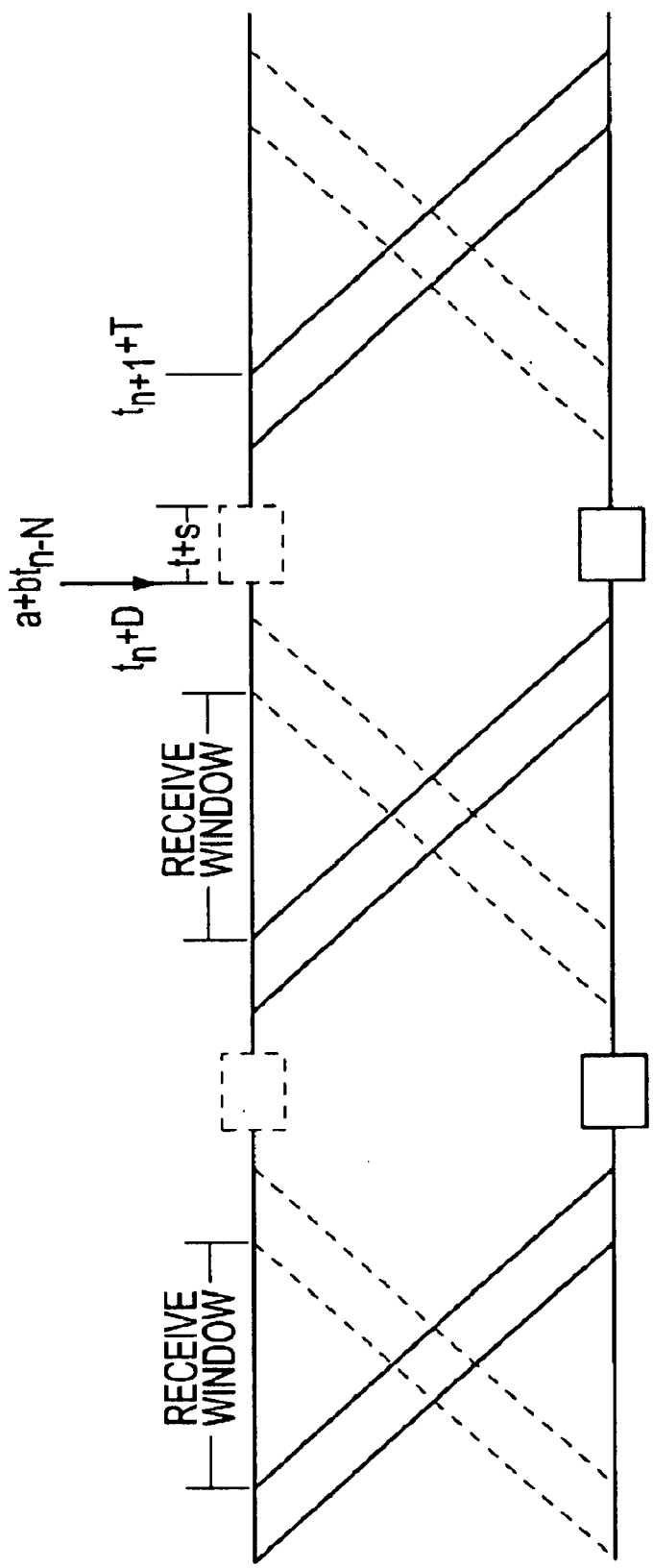
FIG. 11 is a graphical representation of the operation of a timing model for the emission of pulses by the lead and trail space vehicles.

This is illustrated in FIG. 11. To satisfy this equation exactly at all times would require a pulse timing model with a large number of parameters. Without sacrificing too much accuracy a simpler pulse timing model such as the following may be employed:

$$t_n = An + Bn^2$$

where A and B are the parameters to be determined.

In solving for these parameters two equations may be employed. The equation is as follows:

$$\left[ \frac{N+(N+1)}{M+(M+1)-2b(M-N)} \middle| \frac{N^2+(N+1)^2}{M^2+(M+1)^2-2b(M-N)^2} \right] \begin{bmatrix} A \\ B \end{bmatrix} = \begin{bmatrix} 2a+S-D \\ 2a+S-D \end{bmatrix}$$

Where M is the total number of pulses transmitted. Further, let n=N as required in the above equation (the first receive window) and n=M (the last receive window before the end of transmission). The above equation is solved for A and B. A and B may then be inserted in the timing model to determine a time of emission for each pulse emitted in a series by the lead and trail space vehicles.

During typical operations of the system described herein, a predetermined number of pulses may be identified to be emitted by the first and second space vehicles for image data collection. Prior to operations of the system, the above timing model may be computed and a time for emission identified for each of the pulses relative to the emission of the first pulse. As the first and second space vehicles collected image data reflected from the plurality of ROI's, this information may be stored temporarily on board. At some point during the operations, this information may be transmitted to a ground station either directly or through any number of intermediary devices such as a relay satellite. Once the information is received it may be processed as described above to generate a topographical map of the plurality of ROI's.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for temporal topographical data collection in a synthetic aperture radar interferometry (SAR) system comprising:

a first space vehicle configured for emitting electromagnetic energy and collecting a first IFSAR image data set for at least one region of interest (ROI) movable along a first orbital track;

a second space vehicle moving in a aligned orbital path relative to the first space vehicle, wherein the second space vehicle is configured to emit electromagnetic energy and collect a second IFSAR image data set for the at least one ROI; and the first and second space vehicle being further configured to emit the electromagnetic energy pulses in a manner so as to be substantially non-interfering with the IFSAR data collection of the other space vehicle.

2. The system of claim 1 further including a controller in communication with the first and second space vehicles, the controller configured to control the emission of the pulses from the first and second space vehicles over a predetermined period of time.

3. The system of claim 2 the controller is locatable in at least one of: the first space vehicle, the second space vehicle, and a ground station.

4. The system of claim 1 wherein the first and second space vehicles are configured to emit electromagnetic pulses in a manner so as to be substantially non-interfering with the other vehicle for at least one of: direct pulses emitted by the other space vehicle and bistatic pulses.

5. The system of claim 4 wherein the first and second space vehicles are configured to emit the electromagnetic pulses so that the at least one of: the direct pulses and the bistatic pulses contact the other vehicle at other than a receive window for monostatic pulse for the first and second space vehicle.

6. The system of claim 1 wherein the first and second space vehicles are configured to emit the electromagnetic pulses for the IFSAR data collection according to a timing model.

7. The system of claim 6 wherein the timing model is configured such that direct and bistatic pulses are received at the first and second vehicles at times other than during a receive window for receiving monostatic pulses for the first and second space vehicles.

8. The system of claim 6 wherein the timing model is described by the following:

$$t_n = An + Bn^2$$

Where:
n is the pulse number in sequence.
and A and B are solved from:

$$\left[\frac{N+(N+1)}{M+(M+1)-2b(M-N)}\bigg|\frac{N^2+(N+1)^2}{M^2+(M+1)^2-2b(M-N)^2}\right]$$

$$\begin{bmatrix}A\\B\end{bmatrix}=\begin{bmatrix}2a+S-D\\2a+S-D\end{bmatrix}$$

where:
M is the total number of pulses transmitted
N=n
S is the time difference between the near and far corners of the ROI being imaged
D is the distance between the space vehicles.

9. The system of claim 1 wherein the second space vehicle is positioned to trail the first space vehicle in an aligned orbital track by a selected separation.

10. The system of claim 1 wherein the first and second are configured to collect the first and second sets of IFSAR image data at between 20 and 48 degree grazing angles.

11. The system of claim 1 wherein the first and second space vehicles are configured to collect the first and second sets of IFSAR image data at squint angels between approximately 30° and 150°.

12. The system of claim 1 wherein the first and second space vehicles are further configured to collect the first and second sets of IFSAR data at offset collection times which range between approximately $10^{-4}$ to $10^{-3}$ seconds.

13. The system of claim 12 wherein the at least one ROI is a portion of a planetary surface normally in motion and the first and second sets of IFSAR data are employed to characterize the at least one ROI at a instant in time.

14. The system of claim 13 wherein the at least one ROI is a body of water.

15. A method of collecting topographical information from a plurality of synthetic aperture radar (SAR) satellites comprising the steps of:
 directing a lead space vehicle along an first orbital track relative to at least one region of interest (ROI) for which topographical image data is to be collected;
 directing a trail space vehicle in an aligned orbital track relative to the lead space vehicle, wherein the trail space vehicle is at a known separation along the aligned orbital track; and
 emitting one or more electromagnetic pulses from the lead and trail space vehicles substantially simultaneously at the at least one ROI to collect first and second image data sets in a manner which is substantially non-interfering with image data collection of the lead and trail space vehicles.

16. The method of claim 15 wherein the step of emitting one or more electro-magnetic pulses is controlled to avoid interference with the image data collection by the lead and trail space vehicles due to at least one of: direct and bistatic pulses.

17. The method of claim 15 wherein the emitted one or more electromagnetic pulses are timed so that at least one of: interfering electromagnetic energy from the one or more electromagnetic pulses are received at the lead and trail vehicles other than during a receive window for collecting monostatic pulses for the first and second sets of image data.

18. The method of claim 15 wherein the one or more electromagnetic pulses are emitted according to one or more predetermined pulse model.

19. The method of claim 18 wherein the timing for emitting pulse in a sequence of pulse is defined by the following:

$$t_n=An+Bn^2$$

Where:

n is the pulse number in sequence,
and A and B are solved from:

$$\left[\frac{N+(N+1)}{M+(M+1)-2b(M-N)}\bigg|\frac{N^2+(N+1)^2}{M^2+(M+1)^2-2b(M-N)^2}\right]$$

$$\begin{bmatrix}A\\B\end{bmatrix}=\begin{bmatrix}2a+S-D\\2a+S-D\end{bmatrix}$$

where:

M is the total number of pulses transmitted
N=n
S is the time difference between the near and far corners of the ROI being imaged
D is the distance between the space vehicles.

20. The method of claim 15 wherein the one or more electromagnetic pulses from the lead and trail space vehicle are emitted at grazing angles between substantially between 20 and 48 degrees.

21. The method of claim 15 wherein capture time between the first and the second image data sets ranges from between approximately $10^{-4}$ to $10^{-3}$ seconds.

22. The method of claim 15 further comprising the step of varying the pulse model based on at least one of: size of the ROI and the selected scene resolution.

23. The method of claim 15 further comprising the step of transmitting the first and second image data sets to a ground station for interferometric processing.

24. The method of claim 15 wherein the at least one ROI is a portion of a planetary surface normally in motion and the first and second sets of IFSAR data are employed to characterize the at least one ROI at a instant in time.

25. The method of claim 24 wherein the at least one ROI is within a body of water.

* * * * *

UNITED STATES PATENT AND TRADEMARK OFFICE
CERTIFICATE OF CORRECTION

PATENT NO. : 6,864,828 B1
DATED : March 8, 2005
INVENTOR(S) : Golubiewski et al.

It is certified that error appears in the above-identified patent and that said Letters Patent is hereby corrected as shown below:

Column 15,
Line 20, after "second", insert -- space vehicles --;
Line 25, delete "angels" and insert therefor -- angles --.

Signed and Sealed this

Fourteenth Day of June, 2005

JON W. DUDAS
*Director of the United States Patent and Trademark Office*